May 1, 1923.
J. J. MICHALSKI
THEFT DETECTOR FOR AUTOMOBILES
Filed March 17, 1922
1,453,320
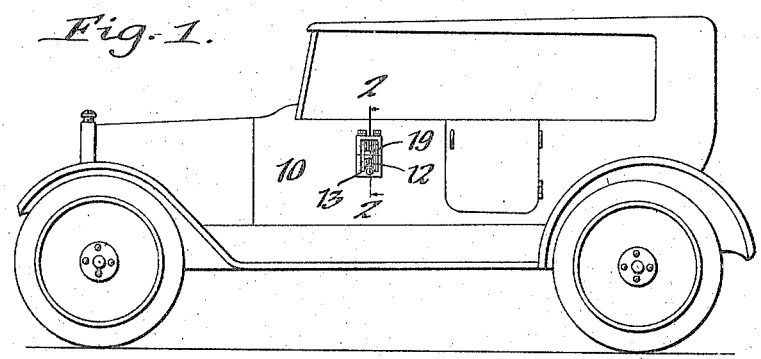
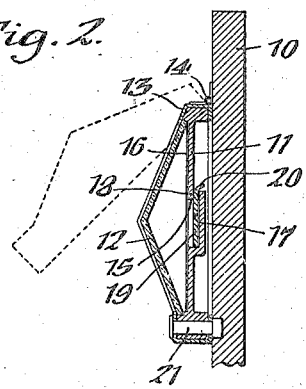
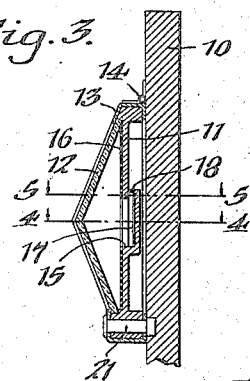
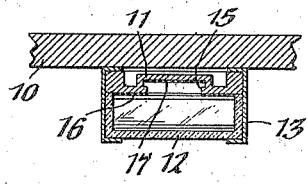
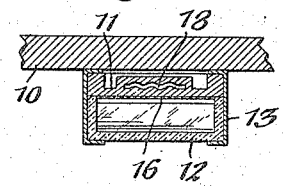
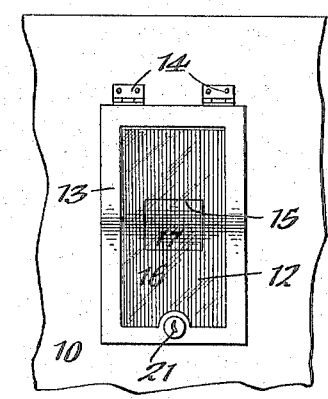
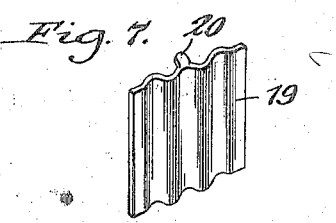
Inventor,
Joseph J. Michalski,
by Geyer Popp
Attorneys.

Patented May 1, 1923.

1,453,320

UNITED STATES PATENT OFFICE.

JOSEPH J. MICHALSKI, OF BUFFALO, NEW YORK.

THEFT DETECTOR FOR AUTOMOBILES.

Application filed March 17, 1922. Serial No. 544,628.

*To all whom it may concern:*

Be it known that I, JOSEPH J. MICHALSKI, a citizen of the United States, residing in Buffalo, in the county of Erie and State of New York, have invented new and useful Improvements in Theft Detectors for Automobiles, of which the following is a specification.

This invention relates to a detector or identifying device for protecting automobiles and similar vehicles from theft.

Its object is to provide a simple and inexpensive device of this character by which police officers and others may readily detect whether or not the vehicle is being driven by the owner or by some unauthorized person.

In the accompanying drawings: Figure 1 is a side elevation of an automobile showing my improvement applied thereto with the detecting member in position. Figure 2 is an enlarged vertical transverse section on line 2—2, Fig. 1. Figure 3 is a view, similar to Fig. 2, but showing the detecting member removed. Figures 4 and 5 are horizontal sections on the correspondingly numbered lines in Fig. 3. Figure 6 is an elarged face view of the improvement with the detecting member removed. Figure 7 is a perspective view of the removable detecting member.

Similar characters of reference refer to like parts throughout the several views.

In the drawings, the improvement is shown as applied to the side of an automobile 10, although it may be located in any other convenient place where it is conspicuous and clearly visible.

The detecting device preferably comprises a box-like or double-walled member including a substantially rectangular rear wall or back plate 11 constructed of aluminum or other appropriate material and a transparent front wall or plate 12 connected to said rear wall by a suitable marginal frame 13. The rear wall of this member is fastened to the automobile body preferably by hinges 14 to permit the detecting device to swing vertically to a position substantially as shown by dotted lines in Fig. 2. The front wall 12 is preferably of prism-like form, its front side sloping in opposite directions and meeting substantially midway of its length, as shown in Figs. 2 and 3. An outwardly-facing recess or pocket 15 of any suitable shape is provided in the rear wall 11, said pocket being preferably disposed directly in rear of and substantially in line with the apex of the sloping front wall. The front face 16 of the rear wall and the corresponding face 17 of the pocket 15 is provided with a colored coating or surface such, for example, as red which forms a bright and conspicuous background clearly visible through the transparent front wall 12.

The pocket is provided in one of its sides, preferably its top, with an opening 18, while the opposing or bottom side is closed, as clearly shown in Figs. 3 and 4. Removably arranged in this pocket to overlie the background 17 thereof, is a detecting or identifying member 19 which may be constructed of any suitable material, but preferably one having a highly finished reflecting surface, such as a mirror, and of any appropriate color, for example, white, which contrasts with the red background 16 of the rear wall 11. When placed in the pocket through the opening 18, the detecting member covers the background of said pocket and is visible through the transparent front wall 12, the same standing out effectively against the surrounding background of the rear wall. Upon the removal of said detecting member from its pocket, the background of the latter is uncovered and together with the surrounding background of the rear wall 11 forms a continuous and uniformly colored ground visible through the transparent front wall.

To facilitate the insertion and removal of the detecting member from its pocket 15, it may be provided with a finger piece 20, as shown in Figs. 2 and 7.

The lower end of the detecting device is provided with a key-operated or other suitable lock 21, for locking the same to the body of the automobile and preventing access thereto, except by authorized persons.

The detecting members of different automobiles are made to vary, so that each of such members fits only the corresponding opening in the pocket 15, rendering it impossible for unauthorized persons to practice deception by the use of similar detecting members. In the example shown in the drawings, the detecting member is corrugated or of irregular form in cross section and the pocket opening 18 is of corresponding shape to receive said member.

In the use of this device, when the owner or other authorized person occupies or drives the automobile, he sees to it that the detecting member 19 is located in its pocket and that the device is locked in position, as shown by full lines in Fig. 2. In this position, the detecting member stands out conspicuously against the contrasting ground 16, serving as an indication to patrolmen and others that the vehicle is under the control of an authorized person. When the car is left standing or parked, the owner unlocks the device, swings it to the position shown by dotted lines in Fig. 2, and removes the detecting member from its pocket, keeping it in his possession, after which he locks said device, leaving nothing but the red background of the rear wall 11 and the pocket 15 exposed to view. In this position of the device, shown in Fig. 6, the same indicates that the owner has left the car unoccupied. Should the car be traveling along the streets with the continuous red background completely exposed, that circumstance will naturally arouse the suspicion that the vehicle is being stolen, and patrolmen and others can therefore promptly arrest the thief.

The provision of the oppositely-sloping front sides of the transparent wall 12 renders it practically impossible to simulate the reflecting surface of the detecting member 19 by pasting a strip of paper or the like over the outer side of said wall.

While affording the effective protection against the theft of automobiles, this improved detector is composed of but few parts, it is neat in appearance and it can be readily installed on vehicles without altering their construction.

I claim as my invention:

1. A theft detector of the character described, comprising a box-like member adapted for attachment to a vehicle to move relatively thereto, the front wall of said member being provided with a transparent portion and its rear wall with a pocket facing said transparent portion and having an opening accessible from the back side of said rear wall, the exposed face of said pocket having a colored area visible through said transparent portion, a detecting member of a contrasting color arranged to normally overlie the colored area of said pocket, and means for locking said box-like member in its normal position, whereby said detecting member is inaccessible in such position.

2. A theft detector of the character described, comprising a support, a double-walled member mounted on said support to move relatively thereto, the front wall of said member being transparent and its rear wall provided with a characteristic ground visible through said transparent front wall, and a movable detecting member applied to the rear wall of said member in co-operative relation to its background and visible through said transparent front wall.

3. A theft detector of the character described, comprising a support, a double-walled member mounted on said support to move relatively thereto, the front wall of said member being transparent and its rear wall provided with a characteristic ground visible through said transparent front wall, a removable detecting member arranged between the front and rear walls of said member and visible through the front wall thereof, and means for locking said first named movable member in its normal position, whereby said detecting member is accessible only in the abnormal position of said member.

4. A theft detector of the character described, comprising a support, a double walled member mounted on said support, the front wall of said member being transparent and its rear wall provided with a pocket facing said front wall, the exposed faces of said rear wall and said pocket being of the same characteristic nature, and a detecting member of a contrasting characteristic nature removably arranged in said pocket and normally covering the exposed face of said pocket.

5. A theft detector of the character described, comprising a support, a double-walled member mounted on said support, the front wall of said member being transparent and its rear wall provided with a pocket facing said front wall and having an opening therein accessible from the inner side of said rear wall, the exposed faces of said rear wall and said pocket being of the same characteristic nature, and a detecting member of a contrasting characteristic nature removably arranged in said pocket and normally covering the exposed face of said pocket.

JOSEPH J. MICHALSKI.